United States Patent
Lovich

(10) Patent No.: US 10,952,002 B2
(45) Date of Patent: Mar. 16, 2021

(54) AUTOMATICALLY SWITCHING ACTIVE MICROPHONE FOR WIRELESS HEADSETS

(71) Applicant: Google LLC, Mountain View, CA (US)

(72) Inventor: Vitali Lovich, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/697,895

(22) Filed: Nov. 27, 2019

(65) Prior Publication Data
US 2020/0169822 A1 May 28, 2020

Related U.S. Application Data

(60) Provisional application No. 62/771,747, filed on Nov. 27, 2018.

(51) Int. Cl.
| | | |
|---|---|---|
| *H04R 29/00* | (2006.01) | |
| *G10L 15/05* | (2013.01) | |
| *G10L 15/08* | (2006.01) | |
| *G10L 15/22* | (2006.01) | |
| *H04R 1/40* | (2006.01) | |
| *H04R 3/00* | (2006.01) | |

(52) U.S. Cl.
CPC ............ *H04R 29/005* (2013.01); *G10L 15/05* (2013.01); *G10L 15/08* (2013.01); *G10L 15/22* (2013.01); *H04R 1/406* (2013.01); *H04R 3/005* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 9,516,442 B1 * | 12/2016 | Dusan | .................. H04R 1/222 |
| 9,924,010 B2 | 3/2018 | Watson et al. | |
| 10,356,232 B1 * | 7/2019 | Nalakath | ............. H04M 1/6066 |

(Continued)

FOREIGN PATENT DOCUMENTS

| | | |
|---|---|---|
| WO | 2017048476 A1 | 3/2017 |
| WO | 2018183020 A1 | 10/2018 |
| WO | 2018183636 A1 | 10/2018 |

OTHER PUBLICATIONS

International Search Report and Written Opinion for International Application No. PCT/US2019/063628 dated Feb. 19, 2020. 15 pages.

*Primary Examiner* — Paul W Huber
(74) *Attorney, Agent, or Firm* — Lerner, David, Littenberg, Krumholz & Mentlik, LLP

(57) ABSTRACT

The present disclosure provides an audio playback system adapted to automatically switch an active microphone back and forth between two or more devices. For example, where the system is a pair of earbuds, where each earbud is worn by a separate user, the system may switch the active microphone to the device worn by the user that is speaking at a given time. While that device holds the active microphone, the other device may wait until a particular event that frees up the microphone, such as if the user wearing the device with the active microphone stops talking. According to some examples, a notification may be provided through one or more of the devices in the system to let the user know, for example, that he does not have the active microphone, that the active microphone is free, that the active microphone has been switched, etc.

20 Claims, 5 Drawing Sheets

(56) References Cited

U.S. PATENT DOCUMENTS

| | | | |
|---|---|---|---|
| 10,692,485 B1* | 6/2020 | Grizzel | .................. G06F 3/017 |
| 2009/0023417 A1* | 1/2009 | Davis | ................. H04M 1/6066 |
| | | | 455/403 |
| 2015/0245129 A1 | 8/2015 | Dusan et al. | |
| 2017/0078785 A1* | 3/2017 | Qian | ........................ H04R 5/04 |
| 2017/0094389 A1 | 3/2017 | Saulsbury et al. | |
| 2017/0311105 A1 | 10/2017 | Hariharan et al. | |
| 2018/0279038 A1* | 9/2018 | Boesen | ................ H04R 1/1016 |
| 2018/0285056 A1* | 10/2018 | Cutler | ..................... G06F 3/013 |
| 2018/0286433 A1* | 10/2018 | Hicks | ................. G10L 21/0232 |

\* cited by examiner

| Mode | First device | Second device |
|---|---|---|
| 1 | Holds active mic | Waits for active mic |
| 2 | Active mic free | Active mic free |
| 3 | Waits for active mic | Holds active mic |

Fig. 4

AUTOMATICALLY SWITCHING ACTIVE MICROPHONE FOR WIRELESS HEADSETS

CROSS-REFERENCE TO RELATED APPLICATIONS

The present application claims the benefit of the filing date of U.S. Provisional Patent Application No. 62/771,747 filed Nov. 27, 2018, the disclosure of which is hereby incorporated herein by reference.

BACKGROUND

Due to limitations in the short range wireless communication standards, wireless earbuds only support one of the buds serving as the active microphone during a phone call. This presents a user experience problem for users as they are unable to easily share their bud with a friend while on a phone call to have a "3-way" call that would work seamlessly. One possible solution is that the user can manually specify on which bud to use the microphone. The manually specified earbud serves as the active microphone regardless of whether it is being worn on the user's head or not. In this mode, the earbud with the active microphone may be in the case for a period of time before the user figures out that voice data is not being captured by the other earbud that is worn.

BRIEF SUMMARY

The present disclosure provides an audio playback system adapted to automatically switch the active microphone back and forth between two or more devices. For example, where the system is a pair of earbuds, where each earbud is worn by a separate user, the system may switch the active microphone to the device worn by user that is speaking at a given time. While that device holds the active microphone, the other device may wait until a particular event that frees up the microphone, such as if the user wearing the device with the active microphone stops talking. Such event may trigger the active microphone to become free, at which point the other device may secure the active microphone. According to some examples, a sidetone or comfort noise or other notification may be provided through one or more of the devices in the system to let the user know, for example, that he does not have the active microphone, that the active microphone is free, that the active microphone has been switched, etc.

One aspect of the disclosure provides a system, including a first device in wireless communication with a second device, the first device including a speaker, a microphone configured to operate in an active mode wherein it captures audio input for transmission to a computing device, and in an inactive mode in which it does not capture audio input, and one or more processors When the first device microphone is in the active mode and the second device microphone is in the inactive mode, the one or more processors of the first device are configured to receive speech input through the first device microphone, detect an endpoint in the received speech input, and provide an opportunity for the second device microphone to switch to the active mode. Detecting the endpoint may include, for example, detecting at least one of a pause, keyword, or inflection. Providing an opportunity for the second device microphone to switch to the active mode may include, for example, switching the first device microphone to the inactive mode. According to some examples, when the first device microphone is in the inactive mode, it listens for audio input without capturing the audio for transmission. The one or more processors of the first device, when the first device is in the inactive mode, may further determine whether to switch the first device microphone to the active mode based at least on the listening.

According to some examples, the one or more processors of the first device may be further configured to receive a notification when the second device microphone switches to the active mode. For example, the notification may be a sound, such as a sidetone or a comfort noise, emitted from the speaker of the first device.

The one or more processors of the first device may be further configured to determine whether the first device microphone is in the active mode, detect whether a user of the first device is providing audio input, and provide a notification to the user of the first device when the first device microphone is in the inactive mode and audio input is detected.

Another aspect of the disclosure provides a method, including receiving speech input through a first device microphone of a first wireless device, wherein the first wireless device operates in an active microphone mode and communicates with a second wireless device operating in an inactive microphone mode, detecting, by one or more processors of the first device, an endpoint in the received speech input, and providing, by the one or more processors of the first device, an opportunity for the second device microphone to switch to the active mode. Providing an opportunity for the second device microphone to switch to the active mode may include switching the first device microphone to the inactive mode.

According to some examples, the method may further include determining whether the first device microphone is in the active mode, detecting whether a user of the first device is providing audio input, and providing a notification through the first device when the first device microphone is in the inactive mode and audio input is detected.

Yet another aspect of the disclosure provides a computer-readable medium storing instructions executable by one or more processors of a first device in wireless communication with a second device to perform a method, including receiving speech input through a first device microphone of the first device, wherein the first device operates in an active microphone mode and communicates with the second wireless device operating in an inactive microphone mode, detecting an endpoint in the received speech input, and providing an opportunity for the second device microphone to switch to the active mode.

BRIEF DESCRIPTION OF THE DRAWINGS

FIG. 4 is a table indicating various possible modes of operation of the auxiliary device according to aspects of the disclosure.

DETAILED DESCRIPTION

Overview:

The present disclosure provides for seamlessly sharing one active microphone source among a plurality of user devices, such as earbuds worn by two different people, without user input. Each user device may be configured to determine which device is likely to need the active microphone. For example, the system may detect endpoints in speech input of a user, and thereby detect when the other user is likely to input responsive speech. Examples of such endpoints may be a pause, keyword, inflection, or other factor. The device that is likely to need the active microphone may be switched to the active microphone. In some examples, a particular device can request or otherwise secure the active microphone. Such device may continue to hold the active microphone until its user temporarily stops providing audio input.

In some examples, each device can detect whether the user wearing the device is talking. If the user is talking, but the device does not have the active microphone, a notification may be provided. For example, a sidetone, comfort sound, or other audible notification may be provided. In other examples, the notification may be tactile, such as vibration of the device.

In some examples, it may be beneficial to indicate to a user of the system whether the device they are using has the active microphone. Such indication may be provided by, for example, a sidetone from the active microphone through a speaker of the devices in inactive mode. In this regard, when the user hears the sidetone, they will know that they do not have the active microphone. As another example, a comfort noise may be provided when the active microphone is free and either device can secure it. In yet another example, volume in the active and/or inactive device may be adjusted in a way to indicate whether the device is active or inactive. Any of a variety of other possible indications may be implemented.

One advantage of such automatic switching of the active microphone, as compared to explicit manual switching, is that it is seamless, and does not require any user interaction. It provides an "expected" behavior for the device without any training, thereby providing an improved user experience. Moreover, the solution comes without the significant consumption of bandwidth and other resources.

Example Systems

Figure 1:
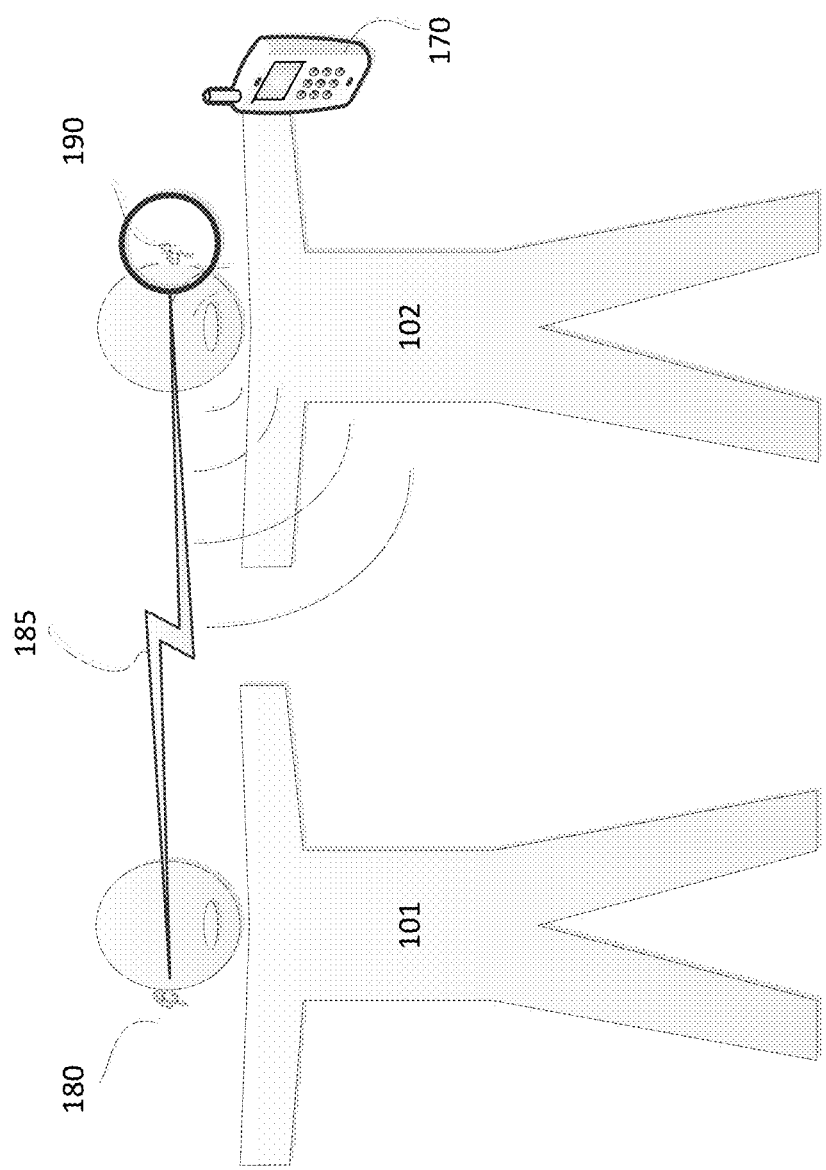
FIG. 1 is a pictorial diagram illustrating an example use of an auxiliary device according to aspects of the disclosure.

FIG. 1 illustrates an example of a user 101 wearing a first audio playback device 180 and a second user 102 wearing a second audio playback device 190. In this example, the first and second devices 180, 190 are earbuds. In other examples, however, the first and second devices may be other types of devices, of the same type or different types. For example, the first device may be an in-ear speaker/microphone while the second device is a smartwatch or a head-mounted display apparatus.

As shown in FIG. 1, the first device 180 is coupled to the second device 190 via a connection 185. The connection 185 may include a standard short-range wireless coupling, such as a Bluetooth connection.

Each of the first device 180 and the second device 190 have a microphone, with only one of the microphones being "active" at a given time. The active microphone may capture the user's voice and transmit it to computing device 170, which may be, for example, a mobile phone or other mobile computing device. In the example of FIG. 1, the second device 180 worn by the second user 102 holds the active microphone, and thus captures the voice input of the second user 102.

The inactive microphone, for example on first device 180, may capture the user's voice for the purpose of determining whether to attempt to secure the active microphone, or to notify the user that voice is not being captured for transmission to the computing device 170.

Each of the first device 180 and the second device 190 may be configured to determine when the user begins talking or stops talking. For example, the device having the active microphone may determine whether its user has reached an endpoint in speech being received by the active microphone. The endpoint may be based on, for example, inflection, rate of speech, keywords, pauses, or other features of an audio input. According to some examples, other information may also be used in the determination, such as voice recognition, movement of the device, changes in a level of interference, etc. For example, the device may determine whether the audio being received through the active microphone if from the user wearing the active microphone or from another user, based on voice recognition, detected movements consistent with a user's jaw moving, volume of the received audio, etc.

The endpoint may serve as an indication that the user of the inactive device will likely provide audio input next. Similarly, the device having the inactive microphone can listen for audio, without capturing the audio for transmission. As such, the device with the inactive microphone may determine whether its user is talking. If so, it can attempt to secure the active microphone, and/or notify its user that its microphone is inactive. The device with the inactive microphone may make similar determinations based on accelerometer movement or other sensor information.

When the user of the device having the active microphone stops talking, the active microphone may be released. For example, both the first device 180 and second device 190 may enter a mode where active microphone is available. According to some examples, releasing the active microphone may include indicating to the computing device 170 that the microphone is entering the inactive mode. For example, the device releasing the active microphone may transmit a signal indicating its release of the active microphone. In this mode, either device may secure the active microphone. For example, the device likely to require the microphone may secure it. The device likely to require the microphone may be, for example, the device that moved in a particular way, the device that was previously inactive, the device for which the user started talking, or any combination of these factors or other factors.

According to some examples, a machine learning algorithm may be implemented to determine which device should switch to the active mode. For example, the machine learning algorithm may use a training set of data including voice input parameters, such as talking time, pausing time, keywords such as proper nouns or pronouns, volume, etc. Other parameters in the training data may include movements, such as measured by an accelerometer or other device, signal strength, battery level, interference, or any other information. Based on one or more of such parameters, the system may determine which device should switch to the active mode to capture user voice input.

According to some examples, one or more sensors on the device may be used in the determination of whether a user of the device having the active microphone stops talking, or if a user of the device having the inactive microphone begins talking. For example, in addition to the microphones, the devices may include capacitive sensors, thermal sensors, or other sensors for detecting whether the electronic device 180 is in contact with skin, thereby indicating whether the electronic device 180 is being worn. In other examples, the sensors may include an accelerometer for detecting movement of the user that is consistent with the user talking. For example, when the user wearing electronic device 180 begins talking, his mouth, jaw, and other parts of his body move. Such movement may indicate talking.

Figure 2:
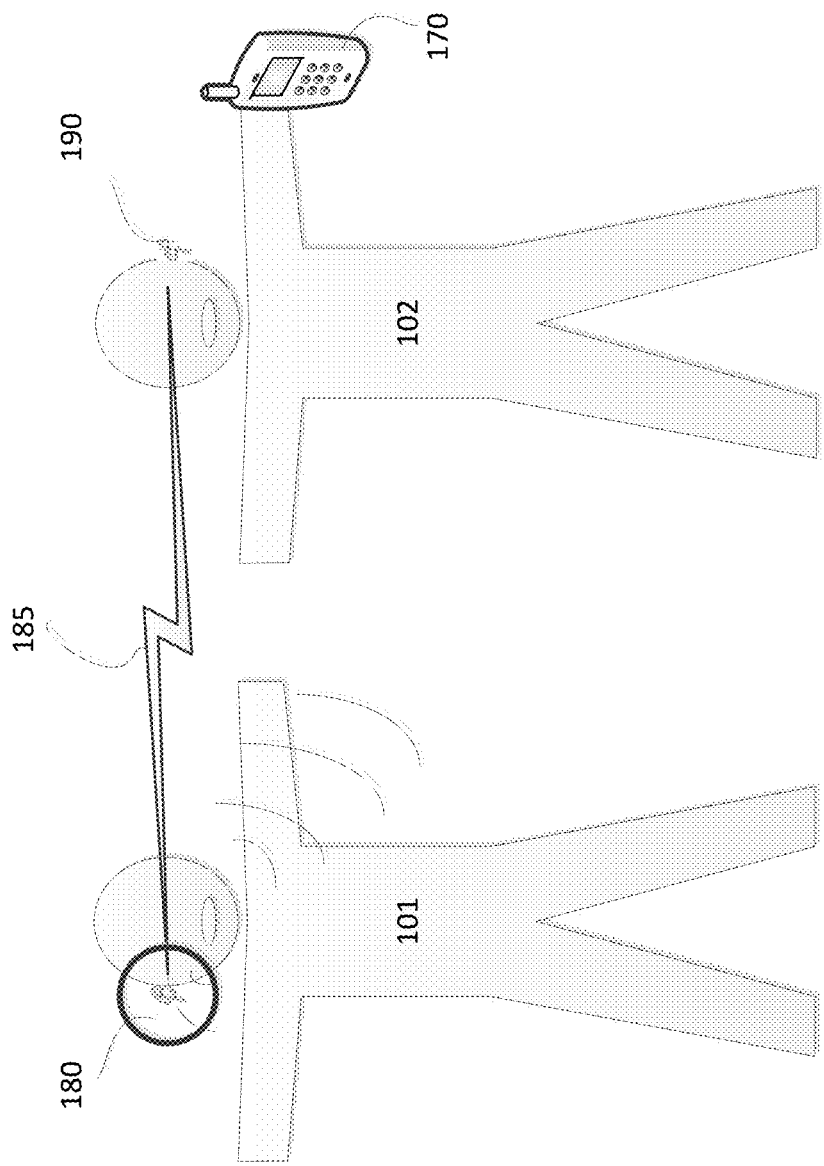
FIG. 2 is a pictorial diagram illustrating another example use of an auxiliary device according to aspects of the disclosure.

FIG. 2 illustrates another example, where the first device 180 has switched modes to operate as the active microphone, and the second device 190 has switched modes to operate as the inactive microphone. As such, the first device 180 may capture the voice of the first user 101 and transmit it to the computing device 170. The second device 190 may wait for the active microphone to become available, such as when the first user 101 stops talking. If the second user 102 begins talking before the active microphone becomes available, a notification may be provided through the second device 190. For example, the second device may play a sound, such as a chime, it may play a sidetone or a comfort tone, it may vibrate, illuminate a light emitting diode, or provide some other type of notification.

Figure 3:
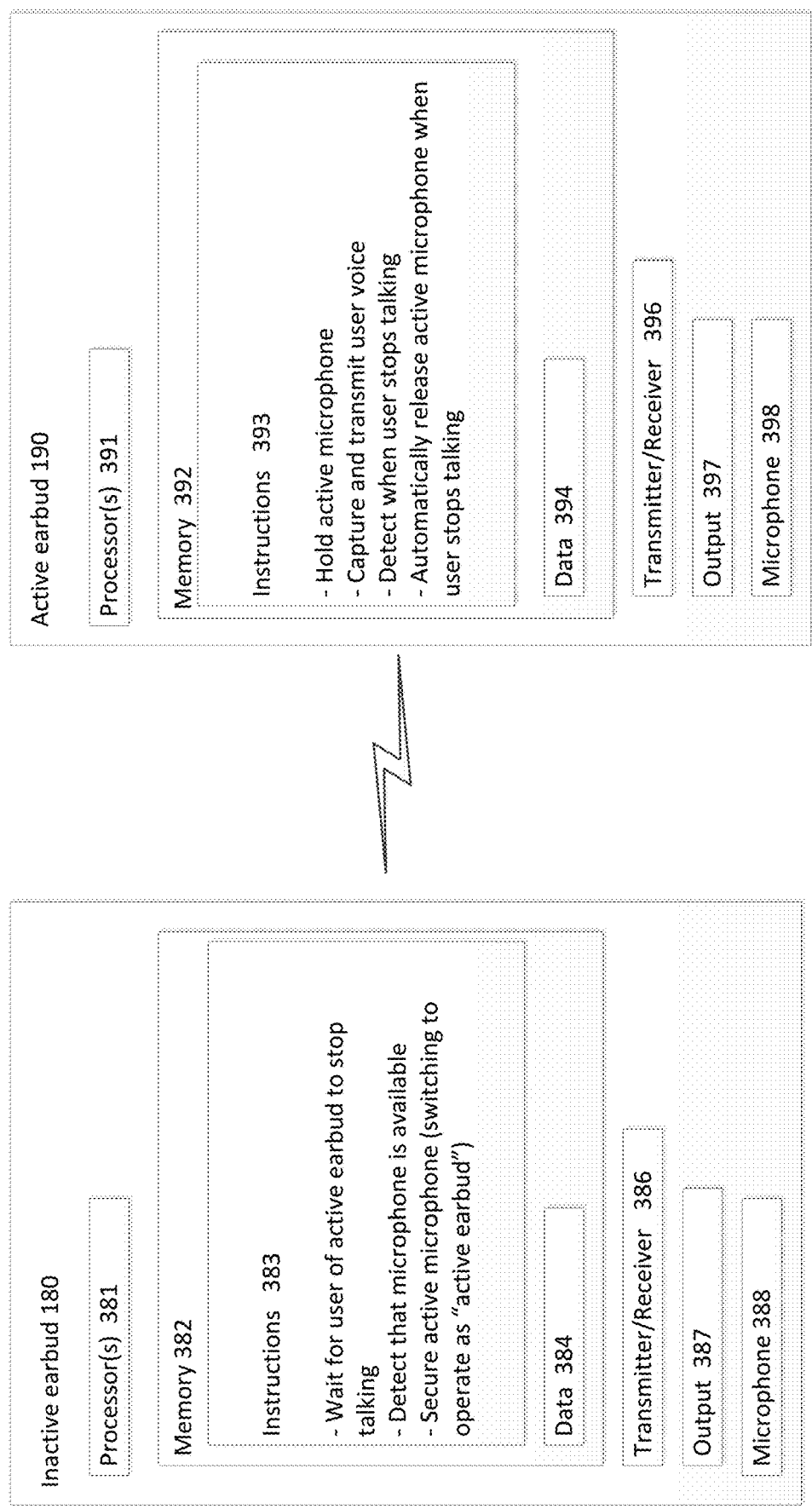
FIG. 3 is a functional block diagram illustrating an example system according to aspects of the disclosure.

FIG. 3 provides an example block diagram of the first auxiliary device 180 and the second auxiliary device 190. The auxiliary devices 180, 190 can be any of various types of devices, such as earbuds, head-mounted devices, smartwatches, etc. Each device includes one or more processors 391, 381, memory 392, 382, and other components typically present in audio playback devices and auxiliary devices. While a number of components are shown, it should be understood that such components are merely non-limiting examples, and that other components may additionally or alternatively be included.

The one or more processors 391, 381 may be any conventional processors, such as commercially available microprocessors. Alternatively, the one or more processors may be a dedicated device such as an application specific integrated circuit (ASIC) or other hardware-based processor. Although FIG. 3 functionally illustrates the processor, memory, and other elements of auxiliary devices 180, 190 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the auxiliary devices 180, 190. Accordingly, references to a processor or computing device will be understood to include references to a collection of processors or computing devices or memories that may or may not operate in parallel.

Memory 382 may store information that is accessible by the processors 381, including instructions 383 that may be executed by the processors 381, and data 384. The memory 382 may be of a type of memory operative to store information accessible by the processors 381, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 383 and data 384 are stored on different types of media.

Data 384 may be retrieved, stored or modified by processors 381 in accordance with the instructions 383. For instance, although the present disclosure is not limited by a particular data structure, the data 384 may be stored in computer registers, in a relational database as a table having a plurality of different fields and records, XML documents, or flat files. The data 384 may also be formatted in a computer-readable format such as, but not limited to, binary values, ASCII or Unicode. By further way of example only, the data 384 may be stored as bitmaps comprised of pixels that are stored in compressed or uncompressed, or various image formats (e.g., JPEG), vector-based formats (e.g., SVG) or computer instructions for drawing graphics. Moreover, the data 384 may comprise information sufficient to identify the relevant information, such as numbers, descriptive text, proprietary codes, pointers, references to data stored in other memories (including other network locations) or information that is used by a function to calculate the relevant data.

The instructions 383 may be executed to improve user experience during a 3-way call, where one user wears the first auxiliary device 180 and another user wears the second auxiliary device 190. For example, the instructions 383 may provide for waiting for an endpoint in speech of the user of the active device, determining that the active microphone has become available, and securing the active microphone.

While the first auxiliary device 180 is executing the instructions 383, the second auxiliary device 190 may also be executing instructions 393 stored in memory 392 along with data 394. For example, similar to the auxiliary device 180, the auxiliary device 190 may also include memory 392 storing data 394 and instructions 393 executable by the one or more processors 391. The memory 392 may be any of a variety of types, and the data 394 may be any of a variety of formats, similar to the memory 382 and data 384 of the auxiliary device 180. While the auxiliary device 180 is receiving and encoding speech from the user wearing the auxiliary device 180, the second auxiliary device 190 may be listening for and receiving speech as well through microphone 398. The instructions 393 may provide for holding the active microphone, capturing and transmitting the voice of the user of the second device 190, detecting an endpoint in the second user's speech, and automatically releasing the active microphone when the endpoint is detected. Accordingly, the first device 180 and second device 190 may be configured to switch back and forth between operating as an inactive microphone device and an active microphone device. Accordingly, while the example of FIG. 3 illustrates a particular set of operations in each set of instructions, it should be understood that either device may be capable of executing either set of instructions, as well as additional or other instructions. By way of example only, the instructions 383, 393 may be executed to determine whether the first and second devices 180, 190 are worn by the same user, to determine which user is providing audio input, etc.

Audible notifications or other audio, such as speech from a user at another end of a phonecall, may be played through outputs 387, 397. The outputs 387, 397 may each include, for example, one or more speakers adapted to provide audible output. In some examples, the outputs 387, 397 may also include one or more other types, such as displays, tactile feedback, etc.

It should be understood that the auxiliary device 180 and mobile device 190 may each include other components which are not shown, such as charging input for the battery, signals processing components, etc. Such components may also be utilized in execution of the instructions 383, 393.

FIG. 4 provides a chart illustrating some example operating modes of the first and second auxiliary devices 180, 190. In a first example mode, the first device holds the active microphone, while the second device waits for the active microphone to be released. For example, the second device may wait for an endpoint in speech of the first user of the first device.

In a second example mode, the active microphone is available. In this mode, the active microphone has been released from its previous device, but has not yet been secured by the other device. In practice, the devices will typically only operate in this mode for a very short period of time, such as fractions of a second or millisecond. In this regard, there will not be an uncomfortable amount of dead time when neither device is capturing voice input.

In a third example mode, the second device has secured the active microphone, and the first device waits for an endpoint. In some examples, rather than waiting for an endpoint, the active microphone may switch devices if, for example, the user of the inactive device provides voice input in a particular way, such as above a threshold decibel level or above a particular rate of speed.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
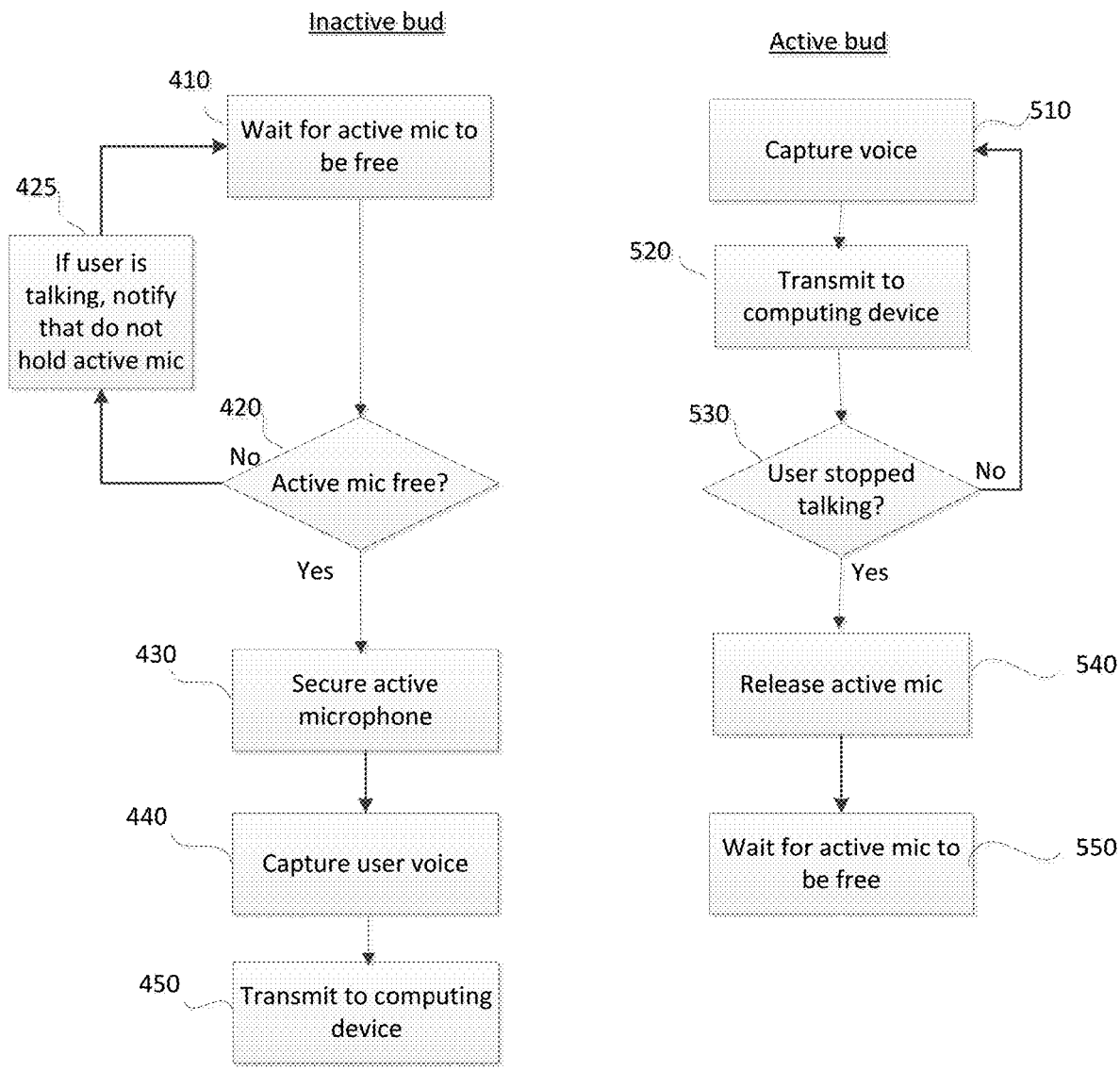
FIG. 5 is a flow diagram illustrating an example method executed by an audio device with an active microphone according to aspects of the disclosure.

FIG. 5 is a flow diagram illustrating an example method executed by an audio system, such as a pair of earbuds, wherein one device in the system is the "active" device and holds the active microphone, while one or more other devices in the system operate as "inactive" devices such that their microphones do not capture audio input.

In block 410, the inactive device waits for the active microphone to become available. Meanwhile, in block 510, the active device captures voice input of a user, and transmits the voice to a computing device in block 520.

In block 530, the active device determines whether an endpoint has been reached, such as whether the user of the active device has stopped talking. The endpoint may serve as an indication that the user of the inactive device will likely provide audio input next. The endpoint may be based on, for example, inflection, rate of speech, keywords, pauses, or other features of an audio input. According to some examples, other information may also be used in the determination, such as voice recognition, movement of the device, changes in a level of interference, etc. If the endpoint has not been reached, the device continues to capture input in block 510. However, if the endpoint has been reached, the active device may release the active microphone in block 540.

In block 420, the inactive device determines whether the active microphone is available. Until it is available, the inactive device will continue waiting. If the inactive device detects that its user is talking in block 425, the inactive device may provide a notification that the device does not have the active microphone. If the active microphone is available, however, the inactive device secures the active microphone (block 430), thereby switching modes. Accordingly, it will capture the user voice (block 440) and transmit it to the computing device (block 450). Meanwhile, the active device, having also switched modes and now operating as the inactive device, waits for the active microphone to become available (block 550).

While the examples above primarily describe two devices sharing an active microphone, in other examples three or more devices may share an active microphone. For example, two inactive devices would wait for the active microphone to become available. When it becomes available, it may be secured by one of the inactive devices, such as whichever device first detects audio input from its user or movement by its user, such as movement of its users jaw or mouth that is consistent with the user talking.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
a first device in wireless communication with a second device, the first device comprising:
a speaker;
a microphone configured to operate in an active mode wherein it captures audio input for transmission to a computing device, and in an inactive mode in which it does not capture audio input; and
one or more processors;
wherein when the first device microphone is in the active mode and the second device microphone is in the inactive mode, the one or more processors of the first device are configured to:
receive speech input through the first device microphone;
detect an endpoint in the received speech input; and
provide an opportunity for the second device microphone to switch to the active mode based on the detected endpoint.

2. The system of claim 1, wherein providing an opportunity for the second device microphone to switch to the active mode comprises switching the first device microphone to the inactive mode.

3. The system of claim 2, wherein when the first device microphone is in the inactive mode, it listens for audio input without capturing the audio for transmission.

4. The system of claim 3, wherein the one or more processors of the first device, when the first device is in the inactive mode, are further configured to determine whether to switch the first device microphone to the active mode based at least on the listening.

5. The system of claim 1, wherein the one or more processors of the first device are further configured to receive a notification when the second device microphone switches to the active mode.

6. The system of claim 5, wherein the notification comprises a sound emitted from the speaker of the first device.

7. The system of claim 6, wherein the sound is one of a sidetone or a comfort noise.

8. The system of claim 1, wherein the one or more processors of the first device are further configured to:
determine whether the first device microphone is in the active mode;
detect whether a user of the first device is providing audio input; and provide a notification to the user of the first device when the first device microphone is in the inactive mode and audio input is detected.

9. The system of claim 8, wherein the notification comprises a sound emitted from the speaker of the first device.

10. The system of claim 1, wherein detecting the endpoint comprises detecting at least one of a pause, keyword, or inflection.

11. A method, comprising:
receiving speech input through a first device microphone of a first wireless device, wherein the first wireless device operates in an active microphone mode and communicates with a second wireless device operating in an inactive microphone mode;
detecting, by one or more processors of the first device, an endpoint in the received speech input; and
providing, by the one or more processors of the first device, an opportunity for the second device microphone to switch to the active mode based on the detected endpoint.

12. The method of claim 11, wherein providing an opportunity for the second device microphone to switch to the active mode comprises switching the first device microphone to the inactive mode.

13. The method of claim 12, wherein when the first device microphone is in the inactive mode, it listens for audio input without capturing the audio for transmission.

14. The method of claim 13, further comprising, when the first device is in the inactive mode, determining whether to switch the first device microphone to the active mode based at least on the listening.

15. The method of claim 11, further comprising receiving a notification when the second device microphone switches to the active mode.

16. The method of claim 15, wherein the notification comprises a sound emitted from the speaker of the first device.

17. The method of claim 11, further comprising:
determining whether the first device microphone is in the active mode;
detecting whether a user of the first device is providing audio input; and
providing a notification through the first device when the first device microphone is in the inactive mode and audio input is detected.

18. The method of claim 17, wherein the notification comprises a sound emitted from the speaker of the first device.

19. The method of claim 11, wherein detecting the endpoint comprises detecting at least one of a pause, keyword, or inflection.

20. A non-transitory computer-readable medium storing instructions executable by one or more processors of a first device in wireless communication with a second device to perform a method, comprising:
receiving speech input through a first device microphone of the first device, wherein the first device operates in an active microphone mode and communicates with the second wireless device operating in an inactive microphone mode;
detecting an endpoint in the received speech input; and
providing an opportunity for the second device microphone to switch to the active mode based on the detected endpoint.

* * * * *

UNITED STATES PATENT AND TRADEMARK OFFICE
CERTIFICATE OF CORRECTION

| | |
|---|---|
| PATENT NO. | : 10,952,002 B2 |
| APPLICATION NO. | : 16/697895 |
| DATED | : March 16, 2021 |
| INVENTOR(S) | : Vitali Lovich |

It is certified that error appears in the above-identified patent and that said Letters Patent is hereby corrected as shown below:

In the Claims

Claim 1, Column 8, Line 34: "mode and the second device microphone is in the" should read -- mode and a second device microphone is in the --.

Claim 11, Column 9, Line 17: "an opportunity for the second device" should read -- an opportunity for a second device --.

Claim 20, Column 10, Line 29: "opportunity for the second device" should read -- opportunity for a second device --.

Signed and Sealed this
Seventh Day of June, 2022

Katherine Kelly Vidal
*Director of the United States Patent and Trademark Office*